United States Patent [19]
Deming

[15] 3,667,024
[45] May 30, 1972

[54] BIDIRECTIONAL SERVOMOTOR SYSTEM
[72] Inventor: Andrew F. Deming, Alliance, Ohio
[73] Assignee: The Alliance Manufacturing Company, Inc.
[22] Filed: Apr. 21, 1971
[21] Appl. No.: 135,852

[52] U.S. Cl. .................................................318/674
[51] Int. Cl. .................................................G05b 11/14
[58] Field of Search ......................................318/674

[56] References Cited

UNITED STATES PATENTS

| | | | |
|---|---|---|---|
| 3,126,506 | 3/1964 | Schneider | 318/674 X |
| 3,171,070 | 2/1965 | List et al. | 318/674 X |
| 3,297,923 | 1/1967 | Schneider et al. | 318/674 |
| 3,527,993 | 9/1970 | Ticknor | 318/674 |

Primary Examiner—Benjamin Dobeck
Attorney—Woodling, Krost, Granger and Rust

[57] ABSTRACT

A servomotor system is disclosed which may be used for an antenna rotator or the like with a bidirectional AC motor controlled as to direction by a low voltage relay having double throw contacts. A DC bridge is energized from a rectifier and has an output to a differential amplifier which energizes a high voltage relay and a low voltage relay in selective conditions. For bridge output in a first direction of unbalance, both relays are energized and for bridge output in the opposite direction of unbalance, only the high voltage relay is energized to provide energization to the entire servomotor system.

20 Claims, 3 Drawing Figures

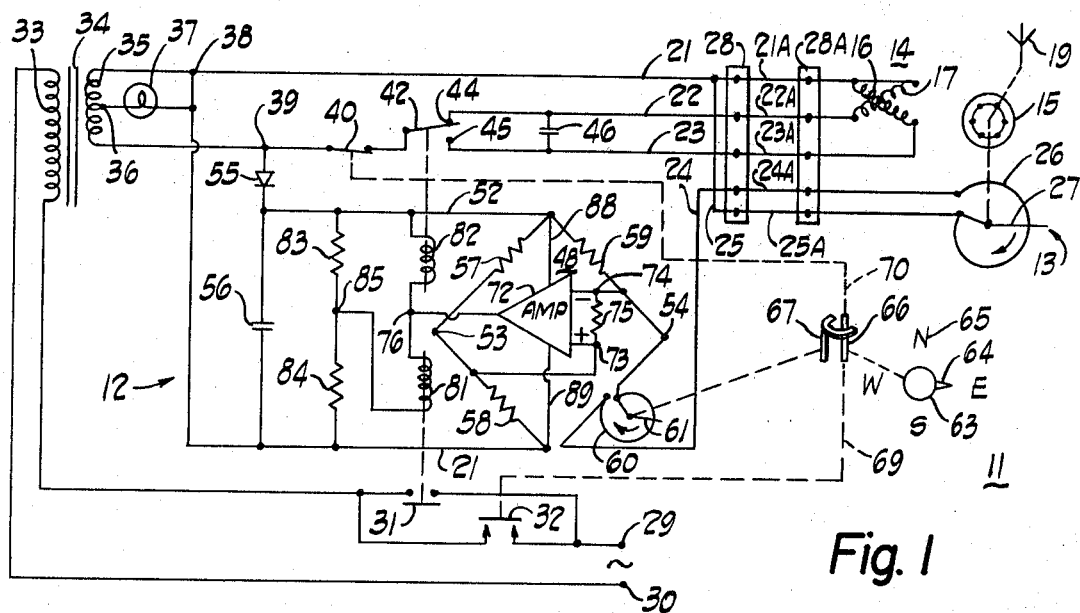
Fig. 1
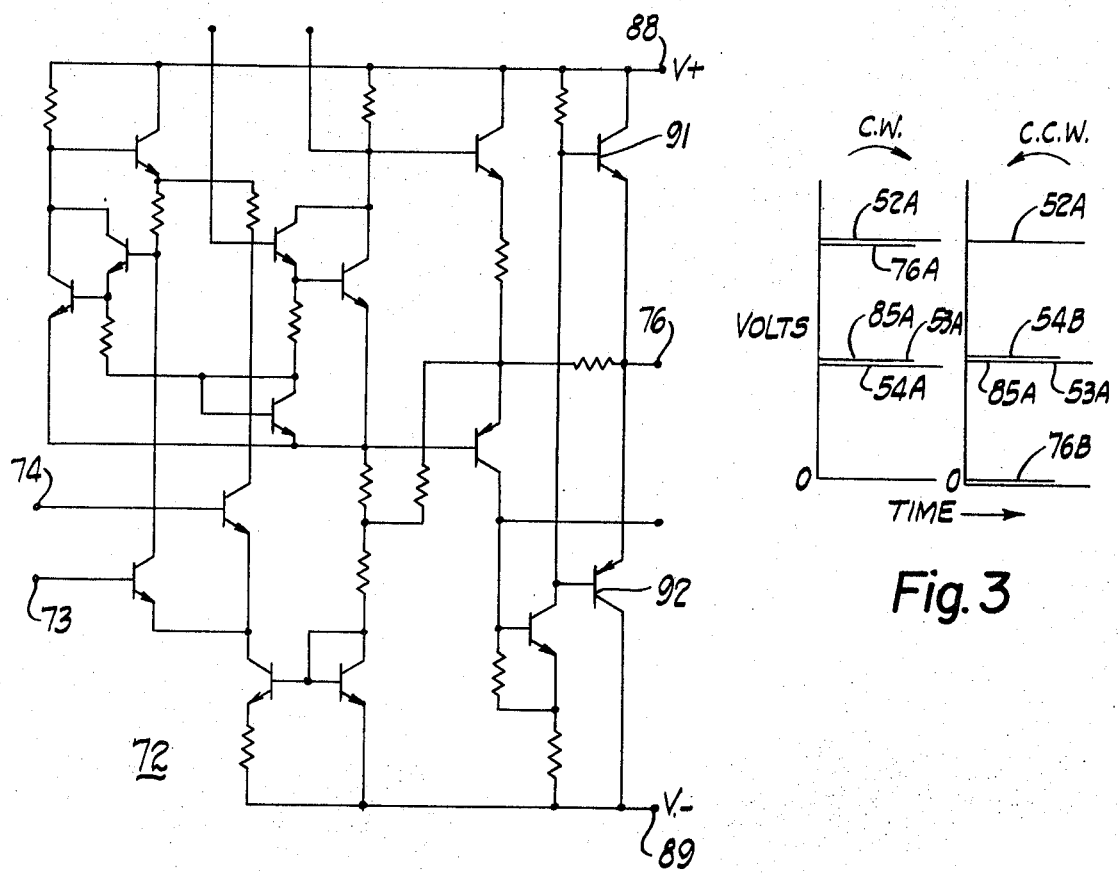
Fig. 2
Fig. 3
INVENTOR.
A. F. Deming
BY Woodling, Krost,
George and Rust
ATTORNEYS.

3,667,024

BIDIRECTIONAL SERVOMOTOR SYSTEM

BACKGROUND OF THE INVENTION

Bidirectional servomotor systems are known utilizing an AC bidirectional motor and an AC bridge circuit which selectively energizes first and second relays for providing selective motor rotation and energization of the entire system. The AC bridge in this circuit is one which is subject to being unbalanced by the presence of a magnetic field, and if it is too close to a magnetic field, then the servomotor unit would not shut off because the bridge would not reach balance. Also with the AC bridge, if the unbalance rheostat was turned in one direction and then inched backward, it was possible to skip over the off or balanced condition. This was partly due to the capacitors across the relays which tended to keep these relays energized for a time delay period. In order to be a satisfactory circuit, it had to be one wherein the high voltage relay dropped out before the low voltage relay dropped out, otherwise, there could be flag waving; namely, the low voltage relay oscillated back and forth to cause the motor output to oscillate back and forth.

Another prior art circuit utilized a DC bridge and a DC reversible motor, however, the patented circuit as disclosed was inoperative and an actual device similar to the patented circuit was unsatisfactory for various reasons. The DC motor was driven through two oppositely connected thyristors which required a sufficiently high voltage to turn them on that the unit had low sensitivity and accuracy. Also, a voltage spike on the AC voltage supply line could trigger the thyristors for improper operation. Still further, the unit under some operational conditions would neither develop enough torque to move the antenna rotator load of the motor nor would it turn off, and the unit has apparently been withdrawn from the market.

Another prior art circuit utilized a bidirectional servomotor with a DC motor and a DC balanceable circuit, however, it required four separate amplifiers in order to have sufficient power gain to energize a total of five different relays controlling motor energization and motor direction of rotation. This was a considerably more complicated circuit than can economically be marketed for antenna rotators. In addition, the circuit was always energized and a DC relay to control motor energization was energized by DC of one polarity only, namely, the polarity did not reverse as one changed from clockwise to counterclockwise rotation. Still further, many different power supplies were required and it had no differential switch acting between two different voltages of a DC source. Still further there was no disabling means to keep the motor from starting in the wrong direction and there could be false direction of motor rotation starts, because if the manual potentiometer is first turned clockwise, the motor will start counterclockwise, but if then the potentiometer is tuned past 180°, then the motor will reverse and run counterclockwise. Additionally, such system had no provision for initially energizing the entire system upon movement of the manual wiper on the potentiometer and hence the system was only applicable wherein the system was constantly energized.

Accordingly, an object of the invention is to provide a servomotor system which obviates the above-mentioned disadvantages.

Another object of the invention is to provide a more reliable bidirectional servomotor system which is economical to manufacture.

Another object of the invention is to provide a bidirectional servomotor system which acts by means of a differential switch to establish two different energization conditions of first and second control means which in turn control energization of the system and bidirectional selection of motor output direction.

Another object of the invention is to provide a bidirectional servomotor system wherein a relay is energized with two opposing polarities for the two directions of motor rotation to thus make certain that the relay is de-energized when the null or zero point is reached.

Another object of the invention is to provide a bidirectional servomotor system operable from a DC bridge circuit to selectively control energization conditions of two relays with the relays connected to two different potentials on a DC voltage source.

SUMMARY OF THE INVENTION

The invention may be incorporated in a bidirectional servomotor system, comprising, in combination, a motor unit and a control unit therefor; said motor unit including reversible output means driven by said motor unit, bidirectional rebalance means driven by said motor; said control unit including voltage source means, a DC balanceable circuit having an input and an output, first means connecting said balanceable circuit to said source for energization thereof, second means connecting said rebalance means to said balanceable circuit for bidirectional rebalancing thereof, a differential switch having input terminals and an output, third means connecting said differential switch input to said output of said balanceable circuit, first and second control means having a de-energized condition and first and second energization conditions, fourth means connecting said first and second control means to the output of said differential switch and to different voltages of said source means, fifth means connecting said first and second control means to control energization of said motor unit and to control said reversible motor output means, and means to unbalance said balanceable circuit.

Other objects and a fuller understanding of the invention may be had by referring to the following description and claims, taken in conjunction with the accompanying drawing.

BRIEF DESCRIPTION OF THE DRAWING

FIG. 1 is a schematic diagram of the preferred embodiment of the invention;

FIG. 2 is a schematic diagram of a differential amplifier used with the invention; and FIG. 3 is a graph of voltages obtained in the circuit of FIG. 1.

DESCRIPTION OF THE PREFERRED EMBODIMENT

FIG. 1 illustrates a servomotor system 11 which embodies the invention. This servomotor system 11 is bidirectional and includes generally a control unit 12 and a motor unit 13. The motor unit 13 includes a bidirectional motor and in this preferred embodiment this is an alternating current motor such as a single phase capacitor-induction motor 14 having a squirrel cage rotor 15 cooperating with first and second stator windings 16 and 17. The motor unit 13 has a reversible output means and in this preferred embodiment this is effected by having the motor rotor 15 as being reversible depending upon the phase of energization of the stator windings 16 and 17. The rotor 15 drives some form of a load in this case shown as an antenna 19.

Conductors 21, 22, 23, 24 and 25, respectively, are connected to a terminal strip 28. This terminal strip 28 may be a part of the motor unit 13 and conductors 21A–25A may be a part of a multi-conductor cable interconnecting terminal strips 28 and 28A at the control and motor units, especially where the control unit is remote from the motor unit 13. The motor unit 13 also includes a rebalance rheostat 26 having a movable wiper 27, which is connected to the first conductor 21. One end of the rheostat 26 is connected to the fifth conductor 25. The stator windings 16 and 17 have one end thereof interconnected at the first conductor 21 and have opposite ends connected to the conductors 23 and 22, respectively. The five-conductor cable 21A–25A may be of any length, and is often 50 to 100 feet long in antenna rotator systems. Conductor 25 is electrically connected to conductor 21 at the control unit 12.

The control unit 12 is adapted to be energized from alternating voltage source terminals 29 and 30, which may be any convenient source such as commercial frequency voltage, for example 115 volts, 60 Hz. This AC voltage is adapted to energize the servomotor system 11 through normally open relay contacts 31 or a normal open manual switch 32 to the primary winding 33 of a transformer 34. This transformer has a secondary winding 35 with a midtap 36, a pilot lamp 37 is connected between the midtap 36 and a first end terminal 38 which is connected to the first conductor 21. The secondary winding 35 has a second end terminal 39 connected to energize the motor unit 13. This secondary winding 35 may have a suitable low voltage, for example, 12 to 28 volts. The end terminal 39 is connected to the motor unit 13 through a momentary break manual switch 40 which has normally closed contacts, and through a single pole double-throw switch 42 having contacts 44 and 45 connected respectively to the conductors 22 and 23. A capacitor 46 is connected across the switch terminals 44 and 45 to provide selective leading current energization to the motor windings 16 or 17.

The control unit 12 includes a DC balanceable circuit 48 which in the preferred embodiment is shown as a bridge circuit. This bridge circuit is energized across the conductor 21 and a conductor 52, and has output terminals 53 and 54. A DC voltage appears across the conductors 52 and 21, for example, by a rectifier 55 connected between secondary terminal 39 and the conductor 52, and with this direct voltage filtered by a filter capacitor 56.

The DC bridge 48 has four arms which conveniently may be resistive arms and three of these arms may be formed by resistors 57, 58 and 59. Resistors 57 and 58 are connected in series across the conductors 52 and 21 with a bridge output terminal 53 connected therebetween. The resistor 59 is connected in series with a rheostat 60 and the rebalancing rheostat 26 across the conductors 52 and 21. The junction of the resistor 59 with the rheostat 60 is a second bridge output terminal 54. The rheostat 60 has a movable wiper 61. The rheostat 60 is an unbalancing means and in this preferred embodiment may be manually moved. One example for the servomotor system 11 is as an antenna rotator wherein the control unit 12 may be located near the television receiver, for example, and the motor unit 13 is located remotely and connected to drive the television receiving antenna bi-directionally. A manual knob 63 has a pointer 64 cooperating with indicia 65 to indicate the desired direction of the antenna orientation. The knob 63 is connected through a lost motion device 66–67 to relatively move the wiper 61 and rheostat 60 to change the resistance thereof. The knob 63 may rotate the rheostat 60 but in the preferred embodiment is shown as moving the wiper 61. The lost motion input 66 is connected directly to the knob 63 and also connected directly by a connection indicated at 69 to the normally open momentary manual switch 32. It is also connected through a connection indicated at 70 to the normally closed momentary manual switch 40. By this construction as soon as the knob 63 is moved, the manual switch 40 is opened before the manual switch 32 is momentarily closed. This prevents false starts of the motor rotation in the wrong direction. The closing of the momentary switch 32 provides energization to the transformer 34 thus providing energization to the entire system 11. The rotation of the knob 63 also acts through the lost motion means 66–67 to change the value of the unbalance rheostat 60 and thus unbalance the bridge 48.

The output of the bridge 48 is applied to a differential switch 72. In this preferred embodiment the differential switch is shown as a differential operational amplifier having a noninverting input terminal 73 and an inverting input terminal 74. Terminals 73 and 74 are connected to the bridge output terminals 53 and 54, respectively. A gain limiting resistor 75 is connected across the input terminals 73 and 74 to limit the gain of the operational amplifier. The normal open circuit gain might be something like 25,000 or 50,000 and this may be limited to a usable gain of only 10 or 100, e.g., by the resistor 75. The differential amplifier 72 has an output at a terminal 76 which is the interconnection between first and second control means 81 and 82. In this preferred embodiment the control means are shown as electromagnetic means and more specifically, as first and second relays 81 and 82. The DC balanceable circuit includes voltage divider means connected across the conductors 52 and 21 and this is illustrated by resistors 83 and 84 interconnected at an intermediate tap 85. The first control means or first relay 81 is connected between the differential amplifier output terminal 76 and this voltage divider tap 85. The second control means or second relay 82 is connected between the differential amplifier output terminal 76 and the DC voltage conductor 52. DC supply voltages are applied to the operational amplifier by a positive supply conductor 88 and a negative supply conductor 89 connected across the conductors 52 and 21, respectively.

OPERATION

The servomotor system 11 has been illustrated as being used with an antenna rotator and this is one typical use. The knob pointer 64 is shown as pointing to the East and for convenience, the pointers 27 and 61 on the rheostats are also shown with the same orientation, and it will be assumed that the DC balanceable circuit or bridge 48 is balanced with everything de-energized. Resistors 57 and 58 accordingly will have the same ratio of resistance as resistor 59 relative to the combined resistances of rheostats 26 and 60 at balance. In the preferred embodiment this ratio is 1:1, although this may be changed to other values, if desired. The conductor 52 will have a positive DC voltage impressed thereon from the rectifier 55 when the transformer 34 is energized and this will be a positive voltage as shown by the rectifier polarity. This may be any suitable voltage, for example, from 12 to 28 volts. This DC voltage energizes the bridge 48 and also energizes the differential amplifier 72 by means of supply conductors 88 and 89.

The differential switch 72 acts similar to a single pole double-throw switch similar to the switch 42. When the differential switch input terminal 74 is driven negative relative to terminal 73, then amplifier 72 acts like a switch interconnecting conductors 76 and 88. Conversely when the input terminal 74 is driven positive relative to input terminal 73, then this amplifier 72 acts like a switch interconnecting conductors 76 and 89. In terms of a differential amplifier, the amplifier 72 may be considered as having two transistors connected in series across the conductors 88 and 89 with the interconnection thereof being the output terminal 76. When the input terminal 74 is driven negative relative to input terminal 73, then this is a negative voltage on an inverting input and hence the output terminal 76 becomes positive. Effectively, this causes conduction of the upper of the two series connected transistors, and effectively ties conductor 76 to conductor 88 except for the forward voltage drop through the transistor. Conversely, when input terminal 74 is driven positive relative to the input terminal 73, this is a positive voltage on an inverting input which drives the output terminal 76 negative. Effectively, this means that the lower of the two series connected transistors is caused to be conducting to connect the terminal 76 to the conductor 89.

The voltage divider 84 has the same ratio of resistance between resistors 83 and 84 as the ratio of resistor 57 and 58. In this preferred embodiment the ratio is 1:1.

Let it be assumed that conductor 21 is at ground or zero or a reference potential and in which case the conductor 52 will be at a positive DC level for example, 18 volts relative to conductor 21. In the preferred embodiment, resistors 83 and 84 are of equal value to establish the intermediate tap 85 as a midtap at one-half the potential on conductor 52 and in this example, this will be 9 volts. Also, in this preferred embodiment, the resistors 57 and 58 are of equal value so that the potential at the terminal 53 is also one-half that at conductor 52.

FIG. 3 shows voltages available at different points in the circuit and line 52A indicates the voltage available at conductor 52 upon energization of the transformer 34. Line 85A is the voltage available at the voltage divider tap 85 and this is also the same as the potential 53A available at the bridge output terminal 53.

Let us assume that the bridge is balanced with the pointer 64 indicating an easterly direction of the antenna 19. Now assume that one grasps the knob 63 and rotates it clockwise. The first thing that happens is that momentarily the manual switch 40 is opened to prevent false starts of the motor in the wrong direction. Next, the momentary switch 32 is closed to energize the transformer 34 and hence the DC bridge 48. After the lost motion connection 66, 67 is taken up, this moves the wiper of the rheostat 60 and this will decrease the resistance thereof. The decreased resistance in this arm of the bridge 48 causes the potential of the bridge at terminal 54 to decrease, that is, move closer toward the potential of the conductor 21. This is shown as a potential line 54A on FIG. 3 and may be only a slight lowering of potential. This negative potential is applied to the inverting terminal 74 of the differential switch 72 and by the inversion action of this amplifier it appears as a large positive potential at the output 76. In effect this is tying together the conductors 76 and 88, except for a small forward drop through a transistor within the differential amplifier 72. Accordingly, the potential 76A at the output 76 is shown in FIG. 3 as being closely in agreement with that potential of the conductor 52. In the above example this will be about 18 volts positive for the potential of terminal 76. This 18-volt potential compared to the 9-volt potential at the tap 85 will apply about 9 volts positive to the top of the high voltage relay 81. This energizes the relay to close the contacts 31 and this will take place within a fraction of a second after movement of the rheostat 60 through the lost motion means 66, 67. Accordingly, this maintains the entire servomotor system 11 energized even though the person releases the knob 63 which will open the momentary switch 32. The entire system 11 remains energized because the bridge 48 is unbalanced and has an output which keeps the relay 81 energized.

This same high positive voltage on the output terminal 76 will establish essentially a zero voltage or only about one-half a volt on the low voltage relay 82. This will be insufficient to provide pull-in energization thereof and accordingly, this relay contact 42 will remain in the position shown in FIG. 1. This establishes direct energization of the motor stator winding 17 and provides leading current energization of the motor stator winding 16 via the capacitor 46. This will establish clockwise rotation of the rotor 15 and of the rheostat wiper 27 which increases the resistance of this rheostat 26 to drive the DC bridge 48 toward a rebalanced condition. When the bridge is rebalanced, the output terminals 53 and 54 of the bridge 48 will be at substantially the same potentials so that there is no longer a large positive output voltage from the differential switch 72. This will de-energize the relay 31 and de-energize the entire servomotor system 11. This system 11 will then be in condition ready for the next displacement movement of the movable wiper 61.

Assume now that the movable wiper 61 is moved in a counter-clockwise direction. First, movement of the knob 63 momentarily opens the manual switch 40 to prevent false direction of motor starts and then closes the momentary switch 32 to energize the entire system. Further movement of the knob 63 acts through the lost motion connection 66, 67 to move the wiper 61 counterclockwise, and this increases the resistance of rheostat 60 to raise the potential of bridge output terminal 54 relative to terminal 53. This makes the differential amplifier input terminal 74 more positive, and a positive input signal on this inverting terminal establishes a large negative output voltage at the differential amplifier output 76. This slightly positive input voltage at terminal 54 is shown at the voltage line 54B in FIG. 3, and the large negative voltage at the output terminal 76 is shown at the voltage line 76B in this FIG. 3. This will be essentially at the zero or reference potential, except for about a one-half volt forward drop across a transistor internally of the differential amplifier 72. This large negative voltage at terminal 76 will establish about 9 volts across the high voltage relay 81 with 9 volts positive at the bottom end of the relay, to quickly energize this relay within a fraction of a second after movement of the knob 63 and before switch 32 is opened. This provides continued energization to the entire system 11. The essentially zero voltage at output terminal 76 also establishes approximately 18 volts across the low voltage relay 82 to energize same and to move the contact blade 42 to the opposite contact 45. This establishes direct energization of the stator winding 16 and leading current energization via capacitor 46 to the stator winding 17. This establishes counterclockwise rotation of the rotor 15 and counterclockwise rotation of the wiper 27 to decrease the resistance of rheostat 26 and drive the bridge 48 toward a rebalanced condition. Upon rebalance the potential of terminal 54 will be substantially that of terminal 53, and the differential amplifier 72 will no longer have an output voltage; hence, relay 81 will be de-energized to open contact 31 and de-energize the entire servomotor system 11.

FIG. 2 shows a schematic diagram of a differential amplifier 72 which may be used with the system 11 of FIG. 1. A suitable differential amplifier is a linear integrated circuit operational amplifier manufactured by Fairchild Semiconductor, No. UA709C. This differential amplifier acts as a differential switch because it has first and second output transistors 91 and 92 connected on opposite sides of the output 76. Transistor 91 is connected between the positive operational voltage terminal 88 and the output terminal 76 and transistor 92 is connected between this output terminal 76 and the negative operational voltage terminal 89. Transistor 91 is an NPN type and when conducting effectively ties together the potentials of conductors 88 and 76, except for the forward voltage drop across transistor 91 which may be in the order of one-half volt. Transistor 92 is a PNP type and when conducting effectively ties together the potentials of conductor 76 and 89, except for the forward voltage drop across this transistor which again may be in the order conduction one-half volt. When a negative voltage is applied on inverting input terminal 74 relative to terminal 73, this negative voltage on an inverting input establishes a positive output voltage which means that the internal circuit connections of the differential amplifier 72 establish that transistor 91 will be conducting; hence, the terminal 76 will have a large positive output. Conversely, when a positive voltage is applied on the input terminal 74, relative to input terminal 73, this positive voltage on an inverting input means that a large negative voltage is obtained at the output 76. This is effected by causing conduction of the output transistor 92 to effectively tie together the output terminal 76 and the negative voltage terminal 89.

The above description shows that a servomotor system 11 has been obtained which is extremely sensitive being accurate to within about 1 percent which is in the order of 3 of accuracy for 360° of rotation of the reversible motor output. The DC bridge 48 is rapidly energized by a very slight movement of the knob 63 which may be in the order of 1° or 2° of rotation and the integrated circuit differential amplifier 72 rapidly provides an output to energize relay 81 thus maintaining the entire system 11 energized. The system 11 remains energized so long as the bridge 48 is unbalanced. The differential amplifier 72 has a large gain, for example 25,000 or more and this is reduced by the input gain limiting resistor 75 which holds the voltage excursion to a safe level, for example 4 volts. There is no problem of balance with this servomotor system 11 as in an AC bridge which tends to remain unbalanced in the presence of a magnetic field. In such case the system would not shut off but it has been found that the DC bridge of the present invention readily shuts off upon reaching balance. Also if someone were to misuse the device by moving the knob 63 back and forth past the null position, the device still operates satisfactory, rather than defectively as in some prior art devices. One reason the system 11 properly selects the motor direction, and reverses the motor direction as one moves the knob through the null position, is that the high voltage relay 81 is energized with 9 volts of one DC polarity for clockwise rotation and energized with 9 volts of the opposite polarity for counterclockwise rotation. This was not the case with other servomotor systems, the polarity on the energization relay remaining the same despite two different directions of rotation. In the present case this reverse polarity of energization of the relay 81 means that the flux in this relay actually must collapse and build up in the opposite direction. As the flux collapses below the dropout point of the relay it positively must drop out.

Another reason why the system is superior in operation is that the high voltage relay 81 always drops out before the low voltage relay 82. This assures prompt de-energization of the entire system upon rebalance of the bridge 48. This dropout of the high voltage relay 81 before dropout of relay 82, is because the specification on this relay provides a high dropout point relative to the pull-in point of this relay, e.g. 80 percent, and conversely the relay 82 has a specification of a considerably lower dropout voltage relative to its pull-in voltage. This is accomplished without any time delay or smoothing capacitors connected across the relay windings and hence any time delay is eliminated in the actuation of these relays. This is still another point of improvement over the prior art systems.

The present servomotor system 11 has control means or relay means 81 and 82 with a de-energized condition and with first and second energization conditions. The first energization condition is with only relay 81 energized and the second energization condition is with both relays 81 and 82 energized. In many prior art systems if an attempt was made to provide too great a gain, that is, to make the device too sensitive, then often there would be flag waving of the output. By this is meant the high voltage relay would not drop out before the low voltage relay. This has the bad effect that the low voltage relay would drop out which reversed the output voltage to the motor. The motor then reversed direction and drove through the bridge null in the opposite direction. The low voltage relay then was again energized because the bridge had an output and this again reversed the motor direction. This periodic reversal would continue from then on because the high voltage relay would not drop out. In the present system even if the low voltage relay contacts were to freeze or burn closed in one position, still the high voltage relay will drop out first and de-energize the entire system 11.

The use of the separate conductors 21A and 25A is desirable in this preferred embodiment. This separates the IZ drop along conductor 21A due to motor current from the IR drop along conductor 25. Accordingly, the bridge balance is independent of motor current. If conductors 21A and 25A were connected together at the motor unit 13 and conductor 25A eliminated, then the voltage drop due to motor current in conductor 21A would introduce inaccuracy into the bridge balance by as much as 10° or 20° of desired position.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A bidirectional servomotor system, comprising, in combination,
    a motor unit and a control unit therefor;
    said motor unit including reversible output means driven by said motor unit,
    bidirectional rebalance means driven by said motor;
    said control unit including voltage source means,
    a DC balanceable circuit having an input and an output,
    first means connecting said balanceable circuit to said source for energization thereof,
    second means connecting said rebalance means to said balanceable circuit for bidirectional rebalancing thereof,
    a differential switch having input terminals and an output,
    third means connecting said differential switch input to said output of said balanceable circuit,
    first and second control means having a de-energized condition and first and second energization conditions,
    fourth means connecting said first and second control means to the output of said differential switch and to different voltages of said source means,
    fifth means connecting said first and second control means to control energization of said motor unit and to control said reversible motor output means,
    and means to unbalance said balanceable circuit.

2. A servomotor system as set forth in claim 1, wherein said differential switch is a differential amplifier.

3. A servomotor system as set forth in claim 1, wherein said balanceable circuit is a DC bridge.

4. A servomotor system as set forth in claim 1, wherein said DC balanceable circuit is a DC bridge having only first and second output terminals.

5. A servomotor system as set forth in claim 1, wherein said differential switch effectively connects the output thereof to either a positive or a negative DC terminal of said source means.

6. A servomotor system as set forth in claim 1, wherein said first and second control means are electromagnetic means.

7. A servomotor system as set forth in claim 1, wherein said first control means is energized in each of said first and second conditions and said second control means is energized in said second condition.

8. A servomotor system as set forth in claim 1, wherein said first control means is energized with a first DC polarity in said first condition and with a second DC polarity in said second condition.

9. A servomotor system as set forth in claim 1, wherein said first control means is energized in each of said first and second conditions and said second control means is energized in said second condition and de-energized in said first condition.

10. A servomotor system as set forth in claim 1, wherein unbalance of said balanceable circuit in either of two directions and energization thereof produces an output from said differential switch to energize said first and second control means selectively in said first and second conditions depending on the direction of circuit unbalance to thus select the direction of said reversible motor output means to drive the rebalance means toward a rebalance of the balanceable circuit whereat the first and second control means are de-energized to stop said motor output.

11. A servomotor system as set forth in claim 1, including means to prevent false direction of movement of said motor output means.

12. A servomotor system as set forth in claim 1, including switch means connected to disenable energization of said motor unit during movement of said unbalance means to prevent false direction of movement of said motor output means.

13. A servomotor system as set forth in claim 1, wherein said fifth connecting means includes means connecting said first control means to control energization of said motor unit and of the entire servomotor system, and includes means connecting said second control means to control said reversible motor output means.

14. A servomotor system as set forth in claim 1, wherein fourth connecting means includes connecting said first control means between the output of said differential switch and a positive DC terminal of said source means which is also connected to said balanceable circuit to energize same.

15. A servomotor system as set forth in claim 1, wherein said fourth connecting means includes connecting said second control means between the output of said differential switch and a tap on a DC voltage divider having a potential substantially the same as the potential on an input terminal of said differential switch.

16. A servomotor system as set forth in claim 1, wherein said first and second control means are first and second relays.

17. A servomotor system as set forth in claim 16, wherein said first relay has connections to only a single pole single throw contact.

18. A servomotor system as set forth in claim 16, wherein said second relay has connections to only single pole double-throw contacts to select the rotational direction of said motor output means.

19. A servomotor system as set forth in claim 18, wherein said first relay has connections to only a single pole single throw contact to control energization to said servomotor system.

20. A servomotor system as set forth in claim 19, wherein said fourth connecting means connects said first and second relays in series and the junction thereof to said differential switch output, and connects the remaining ends of said first and second relays to low and high voltage DC terminals on said source means.

* * * * *